3,420,807
VINYL CHLORIDE POLYMERIZATION
James B. Harrison, Eggertsville, Orville L. Mageli, Grand Island, and Arthur I. Lowell, Amherst, N.Y., assignors to Wallace & Tiernan Inc., Newark, N.J.
No Drawing. Continuation of application Ser. No. 187,920, Apr. 16, 1962. This application Dec. 19, 1966, Ser. No. 603,048
U.S. Cl. 260—92.8      7 Claims
Int. Cl. C08f 3/52; C08f 3/56; C08f 3/22

ABSTRACT OF THE DISCLOSURE

Certain vinyl monomers are polymerized at a temperature below about 70° C. using as the initiator a perester having the general formula:

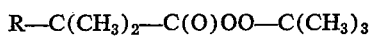

where R is alkyl having 1–10 carbon atoms. Desirably the above initiator is used in conjunction with a di-acyl peroxide, such as lauroyl peroxide.

---

This is a continuation of our copending application Ser. No. 187,920, filed Apr. 16, 1962, and now abandoned.

The present invention relates to the polymerization of a vinyl chloride monomer with t-butyl peroxypivalate.

Heretofore, ethylenically unsaturated monomers, as for instance vinyl chloride, have been polymerized by employing as the polymerization initiator, a host of free radical generating materials of which the currently employed compounds fall within the class of organic peroxy compounds, specifically the acyl peroxides and the organic percarbonates. The azo compounds have also received some public acceptance as commercially suitable polymerization initiators. These latter compounds, however, suffer many disadvantages in use, not the least of which is a resultant vinyl polymer possessing poor heat stability, as compared to polymers produced by other and better polymerization initiators, such as organic acyl peroxides, particularly Alperox C (lauroyl peroxide).

The prime example of an important ethylenically unsaturated monomer capable of being polymerized to a very useful commercial polymer, is represented by the class of materials variously called vinyl monomers, and particularly the vinyl chloride monomers.

Of the organic peroxides available, as polymerization initiators, those peroxides of the long chain fatty acids, as for instance the 12 carbon acid, lauric acid, forms the diacyl peroxide, lauroyl peroxide (Alperox C), and the peroxides of the saturated fatty acids having from about 8 to 18 carbon atoms, may suitably be employed as polymerization initiators in the system of vinyl chloride polymerization. However, when employing such peroxides, as for instance lauroyl peroxide, the polymerization requires upwards of 8 hours in order effectively to produce a vinyl polymer and, in this procedure, a progressive exothermic reaction occurs often, requiring temperature control of the system.

Further, due to the half life characteristics of lauroyl peroxide, it would appear that a fraction only of the few tenths of a percent required to initiate polymerization, is effective in the reaction.

In accordance with the present invention, polymerization of a vinyl chloride is effected by employing a t-butyl peroxy ester of a relatively low molecular weight aliphatic acid as the polymerization initiator, specifically the t-butyl ester of trimethyl acetic acid or pivalic acid. In contrast to the slow start of polymerization with violently accelerated polymerization during the course of the reaction accompanied with extreme generation of heat in a short period of reaction, characteristics of lauroyl peroxide and 8 to 18 carbon atom di-acyl peroxides, the polymerization, for instance, of vinyl chloride, when employing the t-butyl peroxy ester of pivalic acid, is smoother, more amenable to control with rather a straight-line effect, both as to speed of reaction and to heat generation.

The following example is illustrative of the invention but is not to be deemed as limitative thereof.

Example I

Into a pressure vessel is charged 30 ml. of 1% aqueous methocel (1500 centipoise methyl cellulose); 15 ml. of 1% Tween (sorbitan stearate) aqueous solution; 15 ml. of 1% Span 60; deionized water was added to make up to 375 grams. Then there is added 0.076 gram of tertiarybutylperoxy pivalate of 88.3% purity. This solution is frozen and 155 grams of liquefied distilled vinyl chloride added. The initial distillation of the vinyl chloride is to remove inhibitors normaly added thereto. The container is sealed with a self-sealing rubber diaphragm. There being present about 5 g. excess of vinyl chloride, such excess is vented off and recovered. The ice is allowed to melt, then the container is agitated in a constant temperature bath at 50° C. Agitation is continued for about 8 hours until a granular product is obtained. The yield is about 92% polymerized product, i.e., 8% of original gas comes off, leaving the granular polyvinyl chloride and water. The wanted product is filtered, washed and dried. In commercial production it would then be bagged and sold and used in the same manner as any usual polyvinyl chloride polymer.

We can substitute up to about 20% of vinyl chloride with vinyl acetate and get the same course of reaction with production of a desired copolymer. We can also substitute with vinyl stearate up to 50%. In such instance there is copolymerization plus plasticizing action of the stearate. The same dependable course of reaction is obtained on polymerization of the so-called vinylidene chloride.

If we increase the t-butylperoxy pivalate at a given temperature, one can speed up the reaction. So also, one can increase the temperature to obtain a speed-up of the reaction.

The range of pivalate is about 0.01% to 0.60% by weight, based on the monomer. The temperature should be not in excess of 70° C., keeping in mind that the higher concentration of peroxy compound is employed at the lower temperature ranges. The preferred temperature of operation is about 35° C. to 60° C. and is preferably about 50° C.

The t-butyl peroxypivalate may be used and admixed with the usual di-acyl peroxides, such as lauroyl peroxide, and in such case, the pivalate may be present at about 0.02 part per 100 of monomer, as compared with usual concentration of t-butyl peroxypivalate of 0.045 per 100, when used alone, and 0.3 part of lauroyl peroxide per 100 monomer when used alone.

The invention has been illustrated by using the vinyl chloride by reason of the widespread technical application thereof, although the procedure is applicable to the vinylidene chloride and to mixtures of vinyl chloride and vinylidene chloride, the 85% vinyl chloride-15% vinylidene chloride showing excellent results.

The most desirable polymerization initiator is the t-butyl ester of trimethyl acetic acid

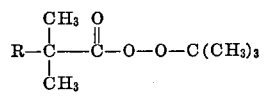

where R is methyl. R can be a lower alkyl group of $C_1$ to $C_{10}$ carbon atoms of the straight chain, branched chain or alicyclic type, as for instance the peroxy t-butyl ester of dimethyl neopentyl acetic acid.

What is claimed is:

1. In the process of making solid polymer wherein vinyl monomer consisting of those selected from the class consisting of (a) vinyl chloride, (b) vinylidene chloride, (c) mixtures of (a) and (b), (d) vinyl acetate in admixture with (a), (e) vinyl acetate in admixture with (b), (f) vinyl stearate in admixture with (a), and (g) vinyl stearate in admixture with (b), is polymerized at a temperature of not more than 70° C., in the presence of an initiating amount of a peroxide polymerization initiator, the improvement which consists essentially of using as said initiator a peroxy ester of the formula

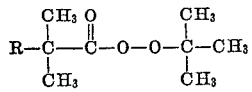

where R is alkyl having 1–10 carbon atoms.

2. The process of claim 1 wherein said polymerization is carried out in an aqueous medium.

3. The process of claim 1 wherein said initiator is t-butyl peroxypivalate and said amount is about 0.01 to 0.60 weight percent based on said monomer.

4. The process of claim 1 wherein said monomer is vinyl chloride.

5. The process of claim 1 wherein said initiator is a mixture of t-butyl peroxypivalate and lauroyl peroxide.

6. In the process of making solid polymer wherein vinyl monomer consisting of those selected from the class consisting of (a) vinyl chloride, (b) vinylidene chloride, (c) mixtures of (a) and (b), (d) vinyl acetate in admixture with (a), (e) vinyl acetate in admixture with (b), (f) vinyl stearate in admixture with (a), and (g) vinyl stearate in admixture with (b), is polymerized at a temperature of not more than 70° C. in the presence of an initiating amount of a peroxide polymerization initiator, the improvement which consists essentially of using as said initiator a mixture of di-acyl peroxide and a peroxy ester of the formula

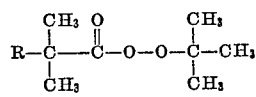

where R is alkyl having 1–10 carbon atoms.

7. The process of claim 6 wherein said polymerization is carried out in an aqueous medium.

References Cited

UNITED STATES PATENTS

| | | | |
|---|---|---|---|
| 2,462,422 | 2/1949 | Plambeck | 260—87.1 |
| 2,497,323 | 2/1950 | Roedel | 260 |
| 2,566,206 | 8/1951 | Hyman | 260 |

OTHER REFERENCES

Bertlett et al., Journal American Chemical Society, vol. 80, pp. 1398–1405 (1958).

JOSEPH L. SCHAFER, *Primary Examiner.*

D. K. DENENBERG, *Assistant Examiner.*

U.S. Cl. X.R.

260—87.1, 87.5, 87.7, 91.7